United States Patent
Kandel et al.

(10) Patent No.: US 9,846,675 B2
(45) Date of Patent: Dec. 19, 2017

(54) DUAL PATH CONTROL FOR VEHICLE JOYSTICK CONTROLLER

(71) Applicant: Robert Bosch GmbH, Stuttgart (DE)

(72) Inventors: Michael G. Kandel, Walnut Creek, OH (US); Steven J. Bernardy, Wooster, OH (US)

(73) Assignee: Robert Bosch GmbH, Stuttgart (DE)

( * ) Notice: Subject to any disclaimer, the term of this patent is extended or adjusted under 35 U.S.C. 154(b) by 602 days.

(21) Appl. No.: 13/915,157

(22) Filed: Jun. 11, 2013

(65) Prior Publication Data

US 2013/0332027 A1     Dec. 12, 2013

Related U.S. Application Data (60) Provisional application No. 61/658,354, filed on Jun. 11, 2012.

(51) Int. Cl.
| | | |
|---|---|---|
| *G06F 17/00* | (2006.01) | |
| *F16H 61/435* | (2010.01) | |
| *B62D 11/00* | (2006.01) | |
| *B60K 26/02* | (2006.01) | |

(52) U.S. Cl.
CPC ............ *G06F 17/00* (2013.01); *B62D 11/003* (2013.01); *F16H 61/435* (2013.01); *B60K 2026/029* (2013.01); *B60Y 2200/25* (2013.01); *B60Y 2200/411* (2013.01)

(58) Field of Classification Search
CPC ...... F16H 61/435; G06F 17/00; B62D 11/003
See application file for complete search history.

(56) References Cited

U.S. PATENT DOCUMENTS

| 6,148,939 A * | 11/2000 | Brookhart et al. ........... 180/6.48 |
|---|---|---|
| 6,233,511 B1 * | 5/2001 | Berger et al. .................... 701/50 |
| 6,425,450 B1 * | 7/2002 | Lansberry ..................... 180/9.36 |
| 6,584,710 B1 * | 7/2003 | Lin et al. ......................... 37/348 |
| 6,892,102 B1 * | 5/2005 | Fushimi ................ E02F 9/2025 |
| | | 345/156 |
| 2003/0104756 A1 * | 6/2003 | Gordon ......................... 446/154 |
| 2003/0125856 A1 * | 7/2003 | Lin et al. ......................... 701/37 |
| 2003/0125858 A1 * | 7/2003 | Lin ...................... B60G 17/005 |
| | | 701/50 |
| 2003/0230447 A1 * | 12/2003 | Wulfert et al. ................ 180/329 |
| 2005/0082809 A1 * | 4/2005 | Dix et al. .................... 280/764.1 |
| 2009/0198414 A1 * | 8/2009 | Mohning et al. ............... 701/41 |
| 2010/0187859 A1 * | 7/2010 | Hill et al. ................ 296/190.01 |

(Continued)

*Primary Examiner* — Adam Tissot
*Assistant Examiner* — Aaron Smith
(74) *Attorney, Agent, or Firm* — Michael Best & Friedrich LLP (57) ABSTRACT

A system for controlling the wheel or track motors of a vehicle based on information from a joystick-type control. In one embodiment, the system includes a joystick control configured to generate X and Y coordinates, and a vehicle controller configured to receive the X and Y coordinates from the joystick control and to determine an adjusted X and Y coordinate combination for each of four vehicle control quadrants. The four vehicle control quadrants include a right-reverse quadrant, a right-forward quadrant, a left-reverse quadrant, and a left-forward control quadrant. The adjusted X and Y coordinate combination for a particular control quadrant is determined based on a control value for that quadrant and a previous control value.

17 Claims, 8 Drawing Sheets

(56) References Cited

U.S. PATENT DOCUMENTS

2011/0088384 A1\* 4/2011 Smith .................. B62D 11/003
                                                    60/428
2014/0174067 A1\* 6/2014 Schulte et al. .................. 60/327

\* cited by examiner

DUAL PATH CONTROL FOR VEHICLE JOYSTICK CONTROLLER

RELATED APPLICATIONS

The current application claims the benefit of prior provisional patent application Ser. No. 61/658,354, filed on Jun. 11, 2012, the entire content of which is incorporated by reference herein.

BACKGROUND

The present invention relates to methods and systems for controlling a vehicle. In particular, the present invention relates to methods and systems for controlling a vehicle with a joystick-type controller.

Vehicles such as a skid-steer tractor, fork lift, or bulldozer include joystick-type controllers for operating the wheels or tracks of the vehicle. Instead of steering by turning the front or rear wheels of the vehicle, some of these vehicles turn by adjusting the speed and direction of rotation of the wheels or tracks of the vehicle. For example, to make a tight left turn, the right track of the vehicle will rotate forward while the left track of the vehicle rotates backward. For a more gradual left turn, the right track and the left track of the vehicle both rotate forward, but the right track may rotate at a faster speed than the left track.

SUMMARY

In one embodiment, the invention provides a system for controlling the wheel or track motors of a vehicle based on an input provided through a joystick-type control. A vehicle controller receives X and Y coordinates (or an X and Y coordinate combination) from a joystick control and calculates a control value for each of four vehicle control quadrants of the system. The four control quadrants include a right-reverse quadrant, a right-forward quadrant, a left-reverse quadrant, and a left-forward control quadrant. The vehicle controller calculates a control value for each control quadrant. The new control value and a previous control value are used to calculate adjusted X and Y coordinates (or an adjusted X and Y coordinate combination) for each control quadrant.

In another embodiment, the invention provides a system for controlling the wheel or track motors of a vehicle based on information from a joystick-type control. The system includes a joystick control configured to generate X and Y coordinates. A vehicle controller is configured to receive the X and Y coordinates from the joystick control and to determine a control value for each of four vehicle control quadrants. The four vehicle control quadrants include a right-reverse quadrant, a right-forward quadrant, a left-reverse quadrant, and a left-forward control quadrant. The vehicle controller also determines an adjusted X and Y coordinate combination for each control quadrant based on the respective control value for respective vehicle quadrant and a previous control value for that quadrant.

In still yet another embodiment, the invention provides a method of controlling the wheel or track motors of a vehicle based on information from a joystick-type control. The method includes generating X and Y coordinates using a joystick control; providing a vehicle controller with the X and Y coordinates; and determining, via the vehicle controller, a vehicle control quadrant to which the X and Y coordinates are correlated. The vehicle control quadrant is selected from a group of four vehicle control quadrants including a right-reverse quadrant, a right-forward quadrant, a left-reverse quadrant, and a left-forward control quadrant. The method also includes determining an adjusted X and Y coordinate combination for the vehicle control quadrant. The adjusted X and Y coordinate combination is determined based on a control value for that quadrant and a previous control value for that quadrant.

Other aspects of the invention will become apparent by consideration of the detailed description and accompanying drawings.

DETAILED DESCRIPTION

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways.

Figure 1:
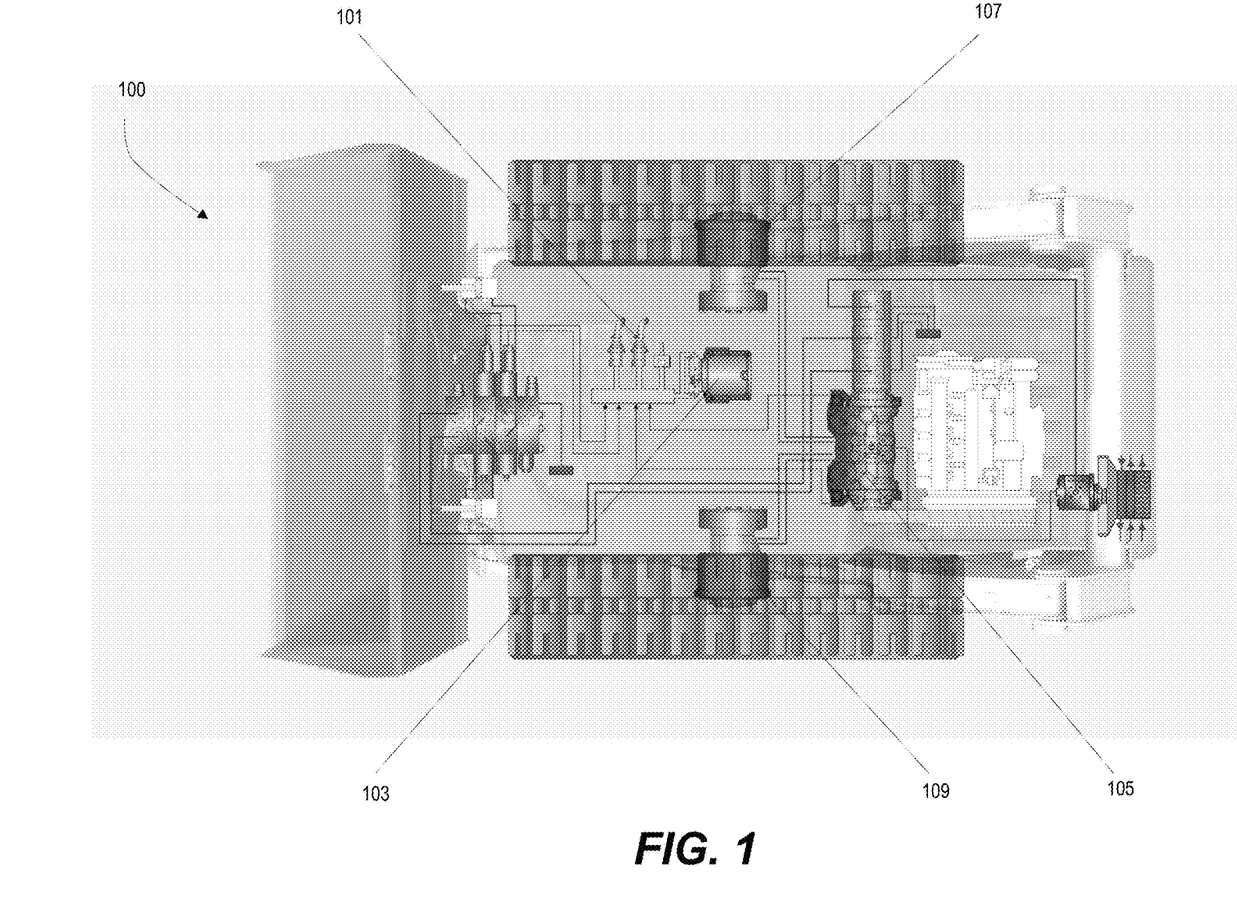
FIG. 1 is an overhead, cross-sectional view of a skid steer vehicle according to one embodiment.

Rather than adjusting the steering angle of the front or rear wheels of a vehicle, some vehicle systems provide for turning by varying the rotational speed and rotational direction of the wheels or tracks of the vehicle. For example, FIG. 1 illustrates a skid steer vehicle 100. The skid steer vehicle 100 includes a joystick control 101, a vehicle controller 103, a travel pump 105, a right-side motor 107, and a left-side motor 109. A user or driver controls the operation of the vehicle using the joystick control 101. The left-side motor 109 controls the forward and backward movement of the left-side vehicle track. The right-side motor 107 controls the forward and backward movement of the right-side vehicle track.

Figure 2:
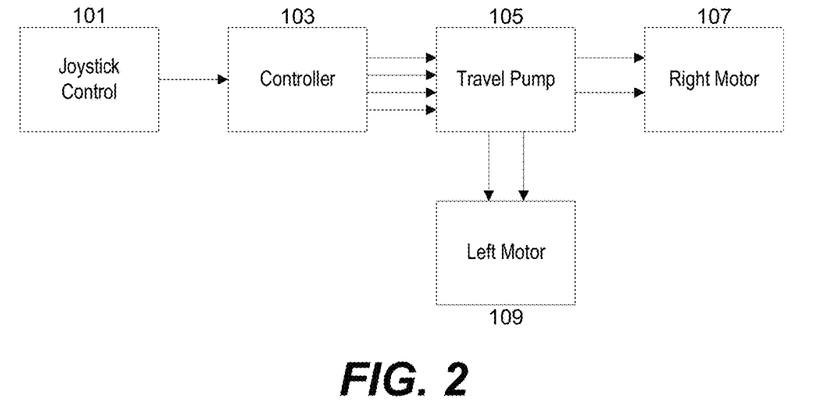
FIG. 2 is a block diagram of the control system of the skid steer vehicle of FIG. 1.

As illustrated in FIG. 2, the joystick control 101 transmits positional data to the vehicle controller 103. The transmitted data indicates the X and Y coordinate position of the joystick. The Y coordinate indicates the desired forward/reverse movement of the vehicle while the X coordinate indicates the desired left/right steering of the vehicle. Based on the X and Y coordinate information provided through the joystick control 101, the vehicle controller 103 determines the control quadrant of the desired movement and calculates an adjusted X and Y coordinate combination for that control quadrant. Thus, the controller is configured to determine an adjusted coordinate combination for each of the four quadrants. The four vehicle control quadrants include a left-forward control quadrant, a right-forward control quadrant, a right-reverse control quadrant, and a left-reverse control quadrant. In one embodiment, the vehicle controller 103 generates a pulse-width modulated (PWM) signal based on the X and Y coordinate combination for each of the four control quadrants and transmits the PWM signals to the travel pump 105. The travel pump 105 operates the right-side motor 107 and the left-side motor 109 according to the PWM signals.

Figure 3:
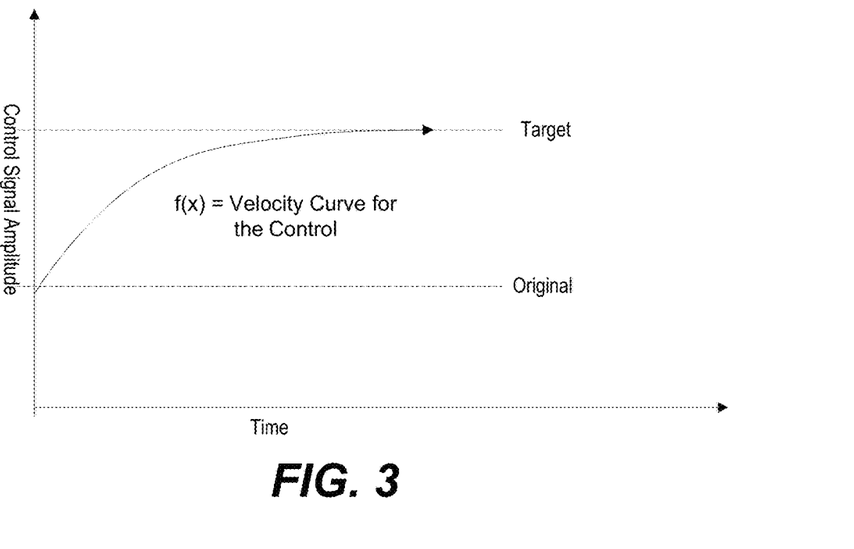
FIG. 3 is a graph showing an example of a ramped adjustment from an original control setting to a target control setting.

The vehicle controller 103 adjusts the X and Y coordinate combination for each quadrant to smooth changes made at the joystick control 101. The adjustments reduce quick, jerky left-to-right/right-to-left steering movements of the vehicle. FIG. 3 illustrates one example of a smoothed control variable being adjusted from a first position (original) to a target position (target). Rather than immediately changing the X and Y coordinate values, the change from the original value to the target value is gradually adjusted over a time period.

Figure 6:
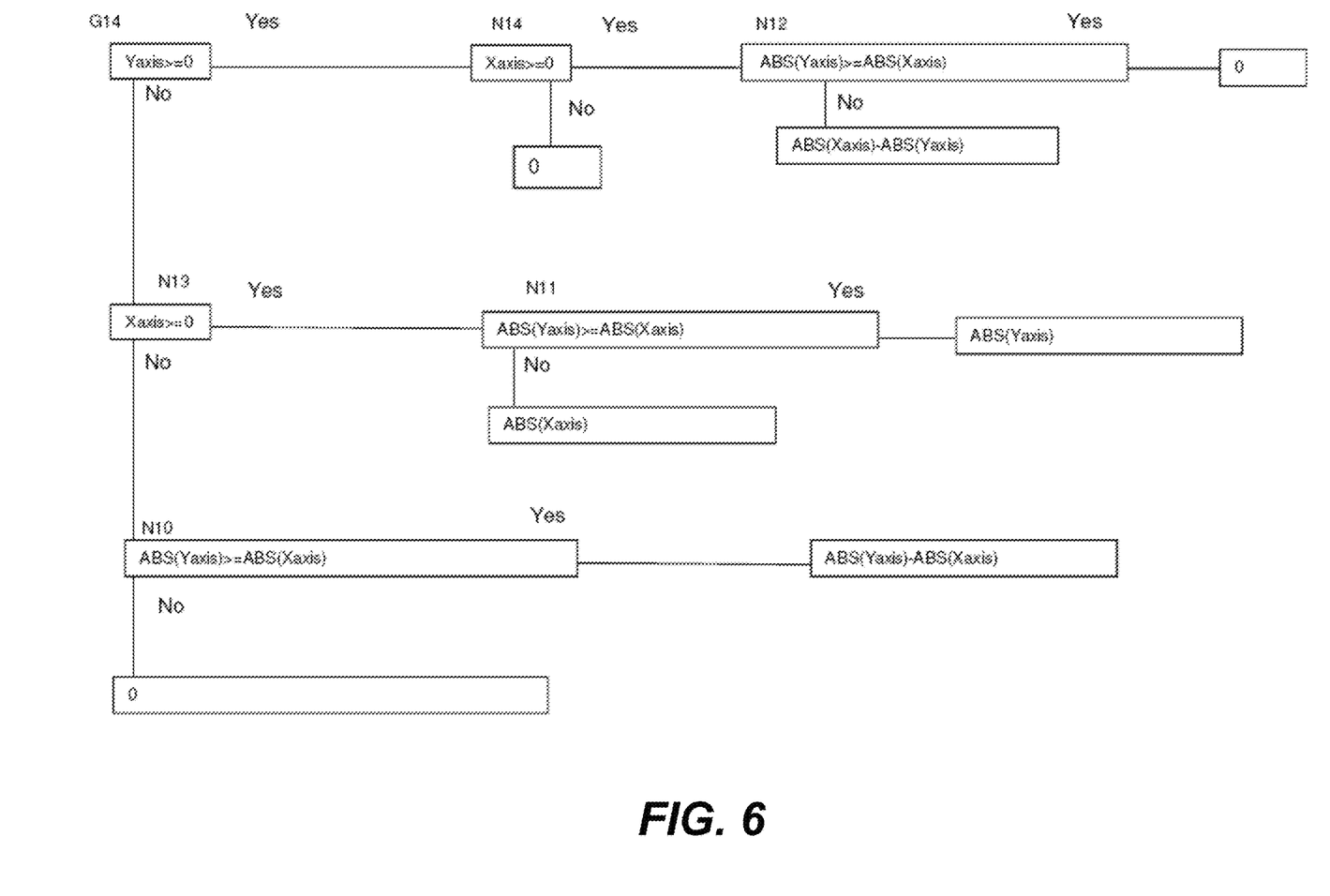
FIG. 6 is a flowchart illustrating a method of calculating a control value for the right-reverse control quadrant of the skid steer vehicle of FIG. 1.
Figure 7:
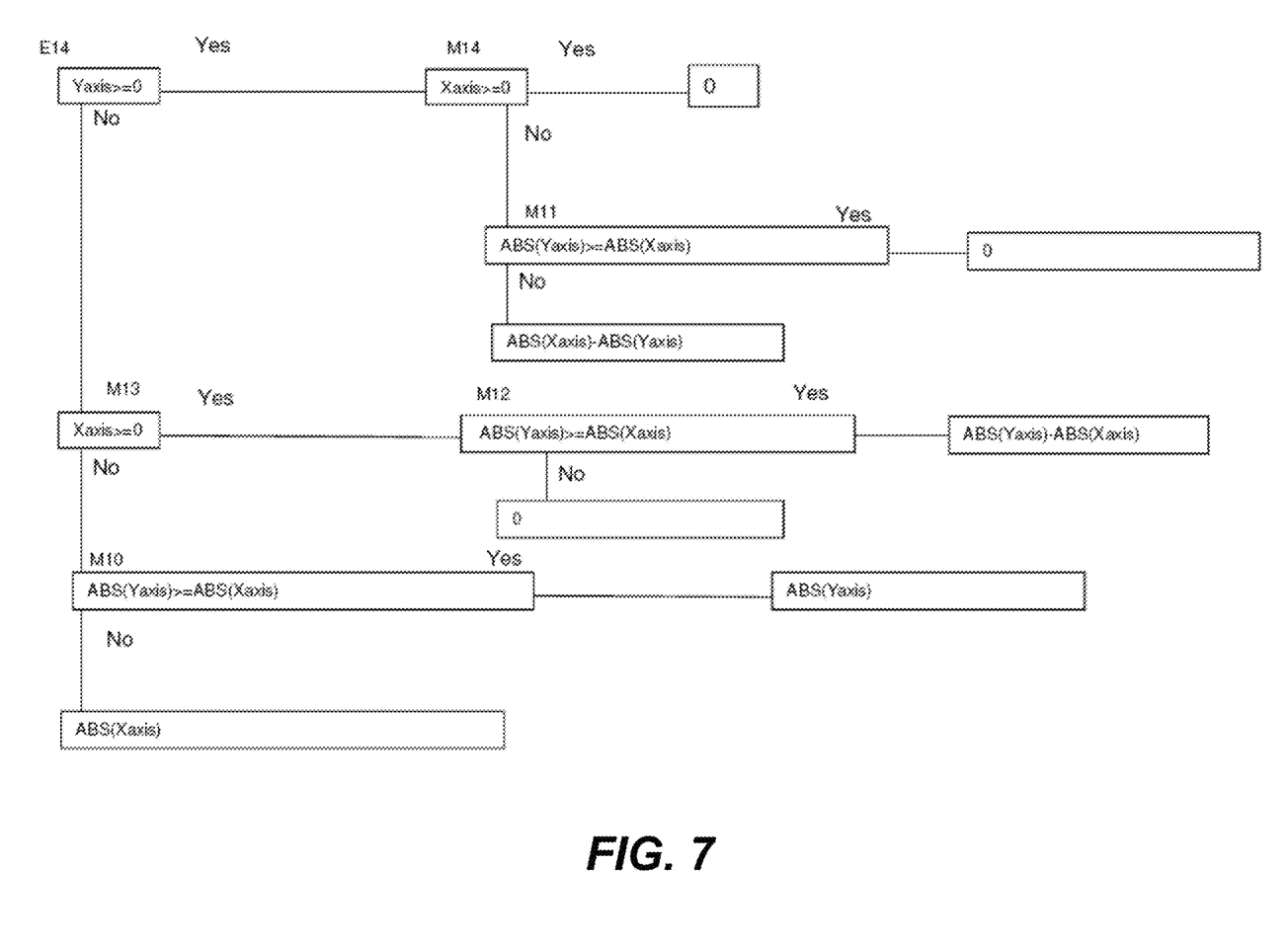
FIG. 7 is a flowchart illustrating a method of calculating a control value for the left-reverse control quadrant of the skid steer vehicle of FIG. 1.
Figure 8:
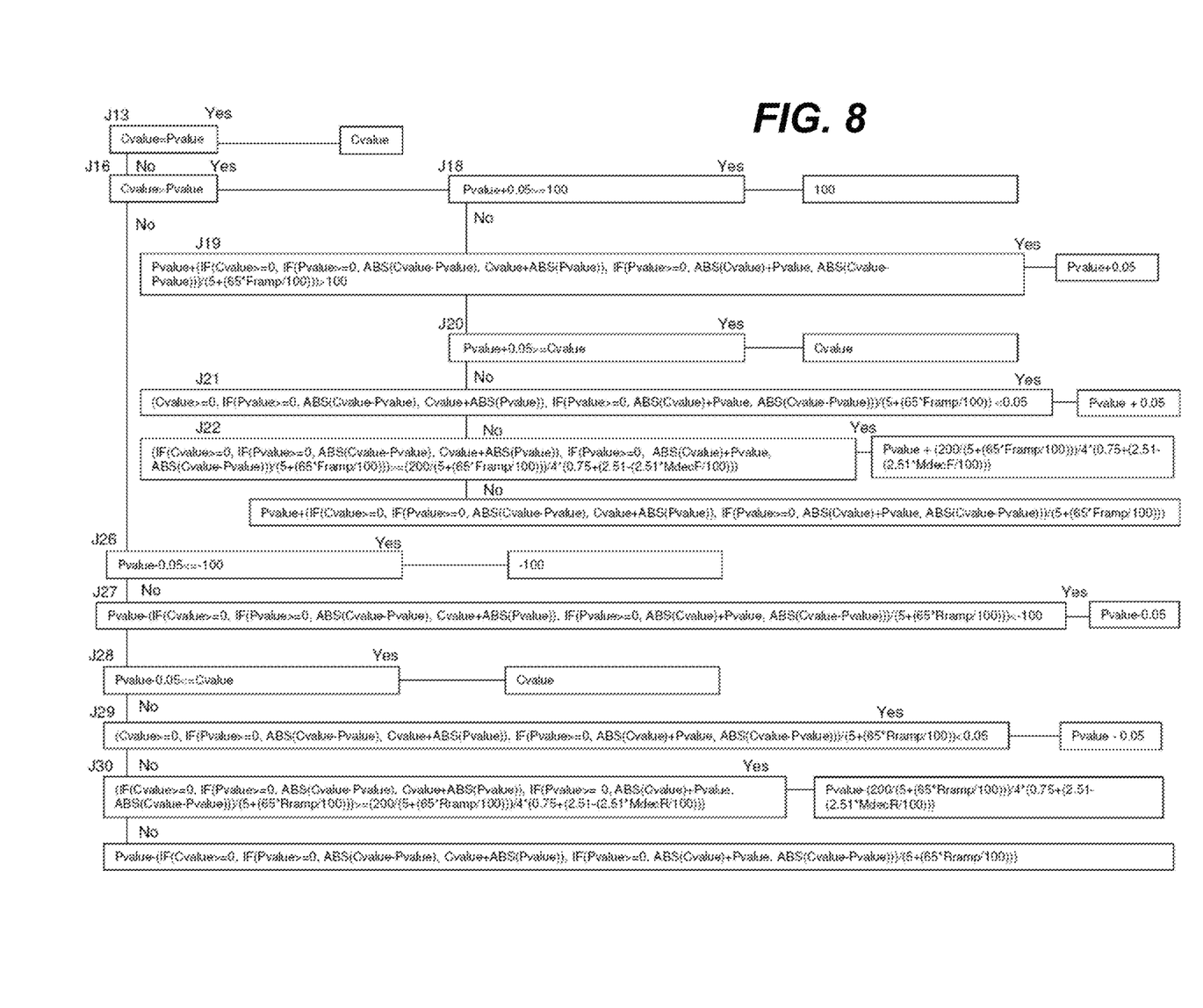
FIG. 8 is a flowchart illustrating a method of calculating a Y coordinate of an adjusted X and Y coordinate combination for a control quadrant of the skid steer vehicle of FIG. 1 based on a control value for the control quadrant calculated according to a method of one of FIGS. 4-7.
Figure 9:
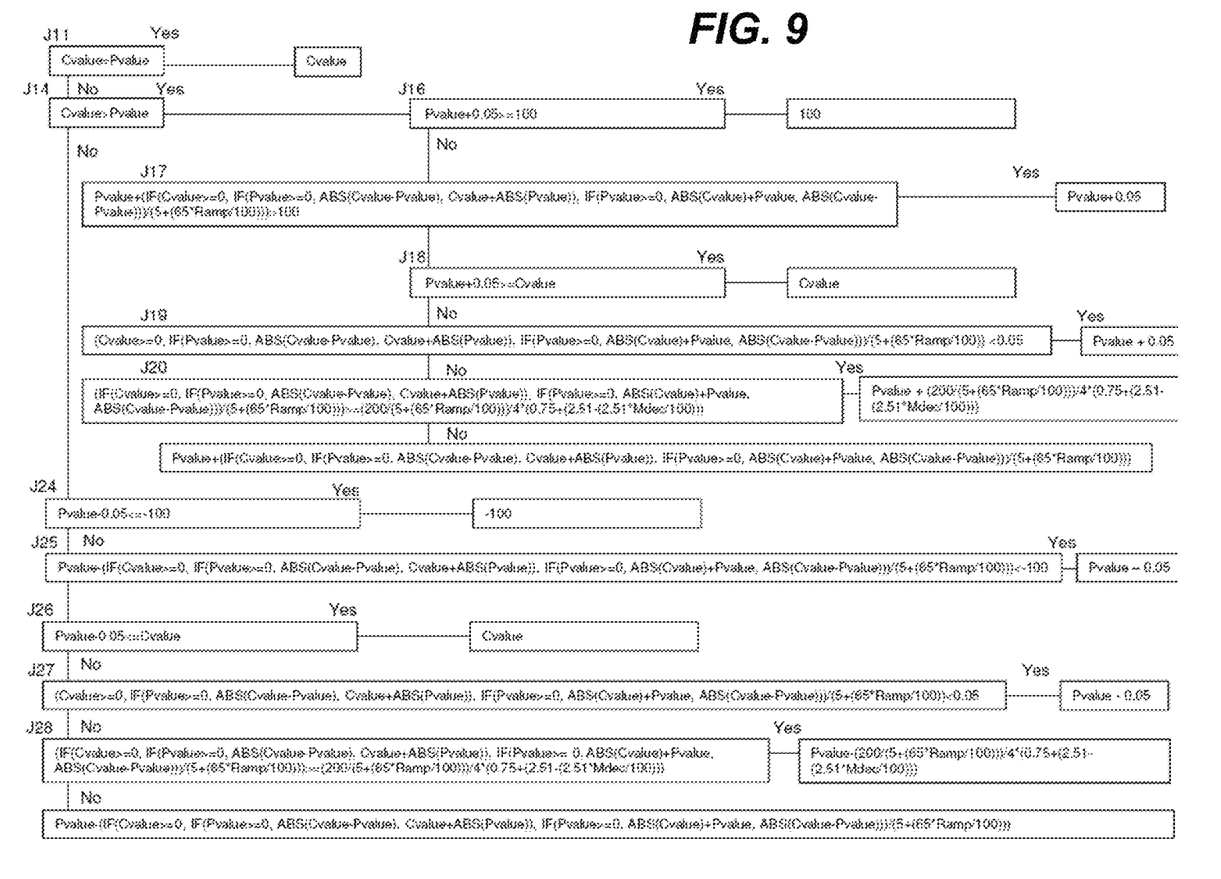
FIG. 9 is a flowchart illustrating a method of calculating an X coordinate of an adjusted X and Y coordinate combination for a control quadrant of the skid steer vehicle of FIG. 1 based on a control value for the control quadrant calculated according to a method of one of FIGS. 4-7.

To provide the adjustment, the vehicle controller 103 calculates a command or control value (a "Cvalue") for each control quadrant. The new Cvalue and a previous control value (a "Pvalue") are used to calculate an adjusted X and Y coordinate combination for each control quadrant. FIGS. 4-7 illustrate a method of calculating a Cvalue for each of the four control quadrants. FIGS. 8 and 9 illustrate method of calculating an adjusted Y and X value, respectively, for each quadrant. In broader terms, the control system and techniques described herein are designed to implement a control ramp within a minimum and maximum of a control range. Ramp times are determined based on the processes shown in FIGS. 4-7 and ramp ranges are determined based on the processes shown in FIGS. 8 and 9. As noted, an exemplary ramp function or curve is shown in FIG. 3. Constant time and constant velocity ramps are, in general, known, but the control ramp technique used in embodiments of the invention is a combination or hybrid of constant time and constant velocity ramps.

Figure 4:
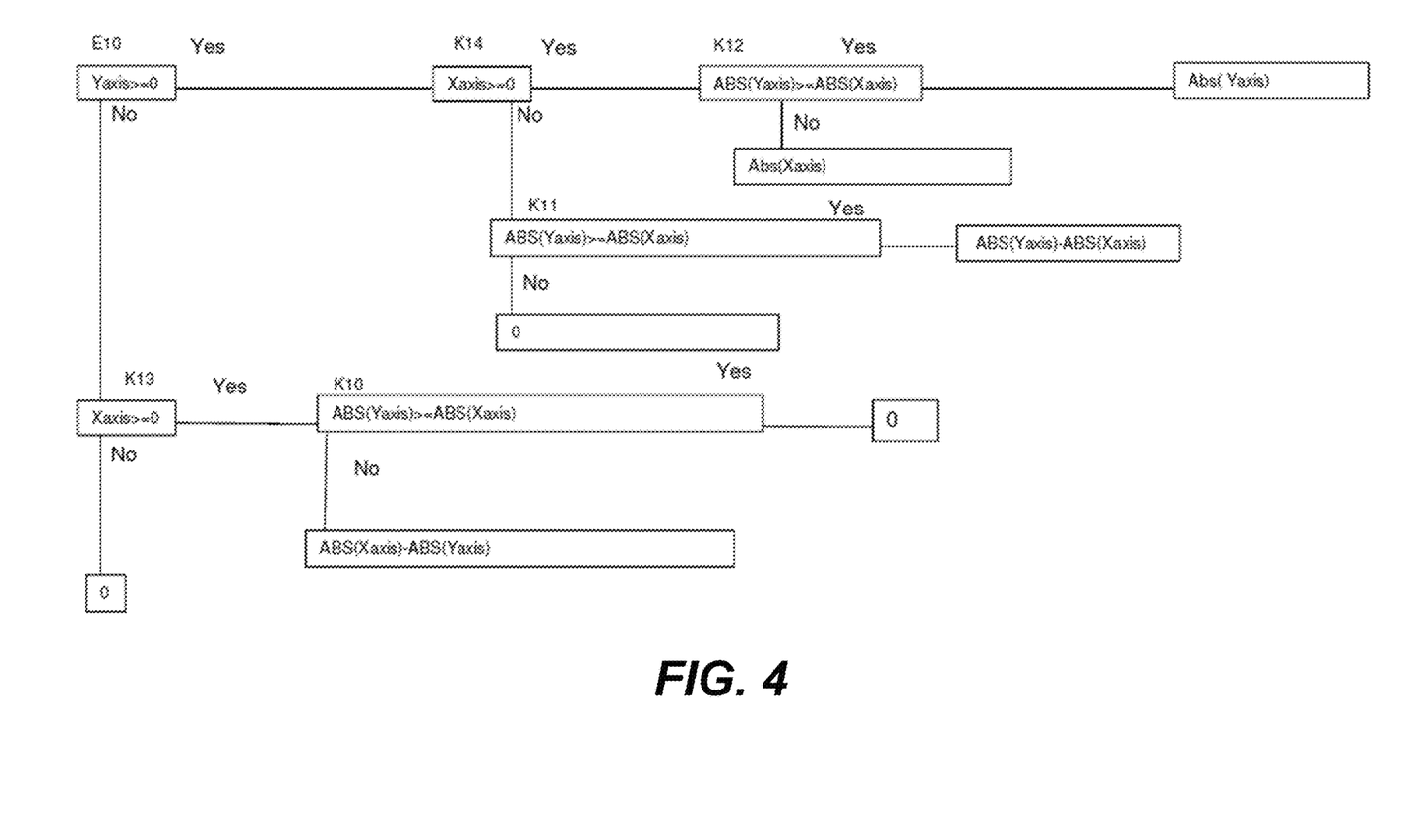
FIG. 4 is a flowchart illustrating a method of calculating a control value for the left-forward control quadrant of the skid steer vehicle of FIG. 1.

FIG. 4 illustrates a method of calculating a Cvalue for the left-forward control quadrant of the skid steer vehicle 100. For example, if the driver intends to make a forward right turn of the vehicle, the joystick will be positioned forward and right of the center joystick position.

The controller 103 compares the Yaxis position or value to zero (step E10) and compares the Xaxis position or value to zero (step K14). The controller then compares the absolute value (ABS) of the Yaxis value to the absolute value of the Xaxis value of the joystick (step K12). If the absolute value of the Yaxis value is greater than or equal to the absolute value of the Xaxis value, the controller determines that the right-turn of the vehicle is more prominent than the forward movement of the vehicle. Therefore, the Cvalue for the left-forward control quadrant is set to the absolute value of the Yaxis value.

If the absolute value of the Yaxis value is less than the absolute value of the Xaxis value, the controller determines that the left-turn of the vehicle is more prominent than the forward movement of the vehicle. As a consequence, the Cvalue for the left-forward control quadrant is set to the absolute value of the Xaxis value. If the Xaxis value is less than zero, the controller compares the absolute value of the Yaxis value and the absolute value of the Xaxis value (step K11). If the absolute value of the Yaxis value is greater than or equal to the absolute value of the Xaxis value, the Cvalue for the left-forward control quadrant is set to the difference between the absolute value of the Yaxis value and the absolute value of the Xaxis value. If the absolute value of the Yaxis value is less than the absolute value of the Xaxis value, the Cvalue for the left-forward control quadrant is set to zero. If the Yaxis value is less than zero, the controller compares the Xaxis value to zero (step K13). If the Xaxis value is greater than or equal to zero, the controller compares the absolute value (ABS) of the Yaxis value to the absolute value of the Xaxis value (step K10). If the absolute value of the Yaxis value is greater than or equal to the absolute value of the Xaxis value, the Cvalue for the left-forward control quadrant is set to zero. If the absolute value of the Yaxis value is less than the absolute value of the Xaxis value, the Cvalue for the left-forward control quadrant is set to the difference between the absolute value of the Xaxis value and the absolute value of the Yaxis value. If the Xaxis value is less than zero, the Cvalue for the left-forward control quadrant is set to zero FIGS. 5-7 similarly illustrate how to define the Cvalue for the right-forward control quadrant, the right-reverse control quadrant, and the left-reverse control quadrant, respectively, for various joystick positions.

Figure 5:
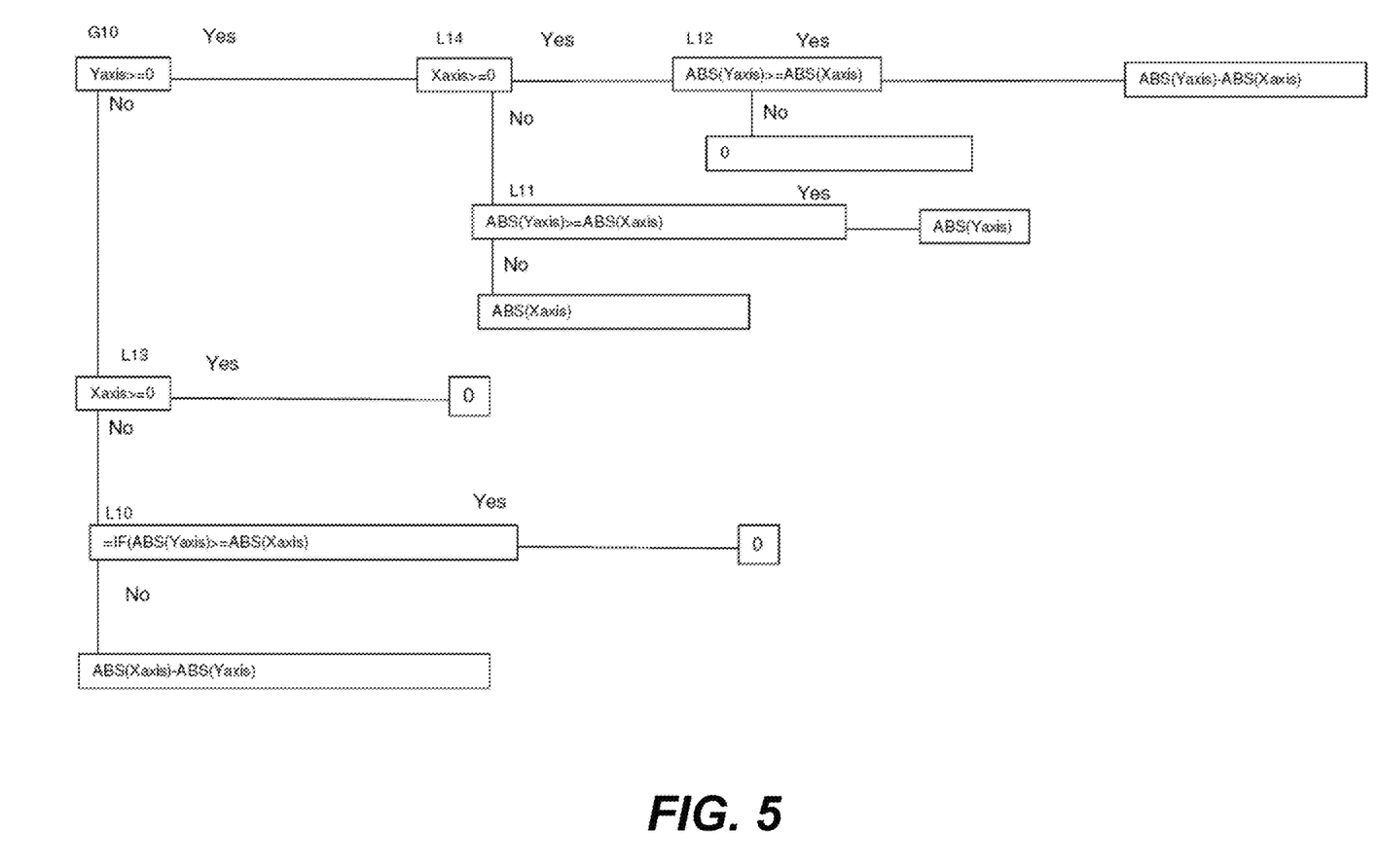
FIG. 5 is a flowchart illustrating a method of calculating a control value for the right-forward control quadrant of the skid steer vehicle of FIG. 1.

If a right-forward control is initiated by the driver, the controller 103 compares the Yaxis value to zero (step G10). If the Yaxis value is greater than or equal to zero, the controller compares the Xaxis value to zero (step L14). If the Xaxis value is greater than or equal to zero, the controller compares the absolute value (ABS) of the Yaxis value to the absolute value of the Xaxis value (step L12). If the absolute value of the Yaxis value is greater than or equal to the absolute value of the Xaxis value, the Cvalue for the right-forward control quadrant is set to the difference between the absolute value of the Yaxis value and the absolute value of the Xaxis value. If the absolute value of the Yaxis value is less than the absolute value of the Xaxis value, the Cvalue for the right-forward control quadrant is set to zero.

If the Xaxis value is less than zero, the controller compares the absolute value of the Yaxis value and the absolute value of the Xaxis value (step L11). If the absolute value of the Yaxis value is greater than or equal to the absolute value of the Xaxis value, the Cvalue for the right-forward control quadrant is set to the absolute value of the Yaxis value. If the absolute value of the Yaxis value is less than the absolute value of the Xaxis value, the Cvalue for the right-forward control quadrant is set to the absolute value of the Xaxis value. If the Yaxis value is less than zero, the controller compares the Xaxis value to zero (step L13). If the Xaxis value is greater than or equal to zero, the Cvalue for the right-forward control quadrant is set to zero. If the Xaxis value is less than zero, the controller compares the absolute value of the Yaxis value to the absolute value of the Xaxis value (step L10). If the absolute value of the Yaxis value is greater than or equal to the absolute value of the Xaxis value, the Cvalue for the right-forward control quadrant is set to zero. If the absolute value of the Yaxis value is less than the absolute value of the Xaxis value, the Cvalue for the right-forward control quadrant is set to the difference between the absolute value of the Xaxis value and the absolute value of the Yaxis value.

If a right-reverse control is initiated by the driver, the controller 103 compares the Yaxis value to zero (step G14). If the Yaxis value is greater than or equal to zero, the controller compares the Xaxis value to zero (step N14). If the Xaxis value is greater than or equal to zero, the controller compares the absolute value (ABS) of the Yaxis value to the absolute value of the Xaxis value (step N12). If the absolute value of the Yaxis value is greater than or equal to the absolute value of the Xaxis value, the Cvalue for the right-reverse control quadrant is set to the zero.

If the absolute value of the Yaxis value is less than the absolute value of the Xaxis value, the Cvalue for the right-reverse control quadrant is set to the difference between the absolute value of the Xaxis value and the absolute value of the Yaxis value. If the Xaxis value is less than zero, the Cvalue for the right-reverse control quadrant is set to zero. If the Yaxis value is less than zero, the controller compares the Xaxis value to zero (step N13). If the Xaxis value is greater than or equal to zero, the controller compares the absolute value of the Yaxis value to the absolute value of the Xaxis value (step N11). If the absolute value of the Yaxis value is greater than or equal to the absolute value of the Xaxis value, the Cvalue for the right-reverse control quadrant is set to the absolute value of the Yaxis value. If the absolute value of the Yaxis value is less than the absolute value of the Xaxis value, the Cvalue for the right-reverse control quadrant is set to the absolute value of the Xaxis value. If the Xaxis value is less than zero, the controller compares the absolute value of the Yaxis value to the absolute value of the Xaxis value (step N10). If the absolute value of the Yaxis value is greater than or equal to the absolute value of the Xaxis value, the Cvalue for the right-reverse control quadrant is set to the difference between the absolute value of the Yaxis value and the absolute value of the Xaxis value. If the absolute value of the Yaxis value is less than the absolute value of the Xaxis value, the Cvalue for the right-reverse control quadrant is set to zero.

If a left-reverse control is initiated by the driver, the controller 103 compares the Yaxis value to zero (step E14). If the Yaxis value is greater than or equal to zero, the controller compares the Xaxis value to zero (step M14). If the Xaxis value is greater than or equal to zero, the Cvalue for the left-reverse control quadrant is set to zero. If the Xaxis value is less than zero, the controller compares the absolute value of the Yaxis value to the absolute value of the Xaxis value (step M11). If the absolute value of the Yaxis value is greater than or equal to the absolute value of the Xaxis value, the Cvalue for the left-reverse control quadrant is set to zero. If the absolute value of the Yaxis value is less than the absolute value of the Xaxis value, the Cvalue for the left-reverse control quadrant is set to the difference between the absolute value of the Xaxis value and the absolute value of the Yaxis value.

If the Yaxis value is less than zero, the controller compares the Xaxis value to zero (step M13). If the Xaxis value is greater than or equal to zero, the controller compares the absolute value of the Yaxis value to the absolute value of the Xaxis value (step M12). If the absolute value of the Yaxis value is greater than or equal to the absolute value of the Xaxis value, the Cvalue for the left-reverse control quadrant is set to the difference between the absolute value of the Yaxis value and the absolute value of the Xaxis value. If the absolute value of the Yaxis value is less than the absolute value of the Xaxis value, the Cvalue for the left-reverse control quadrant is set to zero. If the Xaxis value is less than zero, the controller compares the absolute value of the Yaxis value to the absolute value of the Xaxis value (step M10). If the absolute value of the Yaxis value is greater than or equal to the absolute value of the Xaxis value, the Cvalue for the left-reverse control quadrant is set to the absolute value of the Yaxis value. If the absolute value of the Yaxis value is less than the absolute value of the Xaxis value, the Cvalue for the left-reverse control quadrant is set to the absolute value of the Xaxis value.

After a Cvalue is calculated for each of the four control quadrants, the controller 103 determines an adjusted X and Y coordinate combination for each control quadrant based on the Cvalue and Pvalue. FIG. 8 illustrates a method of calculating an adjusted Y coordinate based on a Cvalue and a Pvalue. FIG. 9 illustrates a method of calculating an adjusted X coordinate based on the Cvalue and the Pvalue. FIGS. 8 and 9 include several expressions listed in the IF(condition, then, else) pseudo-code format. In this format, if the condition expressed in the first field is true, then the value in the second field is considered. If not, then the value of the third field is considered.

To perform a full calculation of an adjusted X and Y coordinate combination for the left-forward control quadrant, the vehicle controller 103 executes the method of FIG. 4 to determine a Cvalue. The vehicle controller 103 then executes the methods of both FIG. 8 and FIG. 9 to determine the adjusted X and Y coordinate combination. This full calculation is performed periodically—for example, every 20 ms. The calculated Cvalue will then become the Pvalue used in the next calculation 20 ms later.

FIGS. 8 and 9 include several adjustable control constants that can be tuned for specific vehicles. These constants include Rramp (reverse ramp), Framp (forward ramp), MdecF (maximum deceleration rate forward), and MdecR (maximum deceleration rate reverse). Each of these constants is set to a value between 0 and 100. Furthermore, X and Y coordinate values are defined within the range of −100 and 100 in FIGS. 8 and 9. An X value of −100 indicates a maximum left turn while an X value of 100 indicates a maximum right turn. An X value of zero indicates a neutral X value (i.e., no left or right turn). The constant values illustrated as numeric values in FIGS. 4-9 are exemplary and may be modified for a specific vehicle type or use. Lastly, some control systems may utilize a microcontroller that only calculates values as whole numbers. In such systems, all values may be multiplied by 10 or 100 in order to allow for the processing of other values. For example, in some systems, the value 0.05 is represented as 5 while the value 100 is represented as 10000.

To provide additional clarity, FIG. 8 will be discussed in additional detail. For purposes of brevity, the process in FIG. 9 will not discussed, it being understood that the logic applied to the Yaxis or coordinate determination of FIG. 8 applies equally to the Xaxis or coordinate determination of FIG. 9. It should also be noted that the algorithms shown in FIGS. 8 and 9 were implemented in spreadsheet software. As a consequence, mathematically complete expressions were required at each step, even though certain conditions are assumed as a result of decisions made in higher branches of the logic.

As shown in FIG. 8, to determine the adjusted Y coordinate, the vehicle controller 103 first compares the Cvalue is to the Pvalue (step J13). If the Cvalue is equal to the Pvalue, the driver or operator has not requested (via the joystick) a change in vehicle movement. Accordingly, the controller sets the adjusted Y coordinate to the value of the Cvalue. If the Cvalue is not equal to the Pvalue, the controller compares the Cvalue to the Pvalue (step J16).

If the Cvalue is greater than the Pvalue (or the Yaxis value has increased), the controller compares the Pvalue plus a minimum step or increment (in the example shown, 0.05) to 100 (representing 100 percent) (step J18). If the Pvalue plus the increment is greater than or equal to 100, the controller sets the adjusted Y coordinate to 100.

If the Pvalue plus the step increment is less than 100, the controller executes logic described in step J19. Generally, in step J19, the controller again analyzes how close the Cvalue is to 100 percent of the defined maximum range. As mentioned above, the pseudo code shown in the drawings has the following format: IF(condition, then, else). The particular logic is Pvalue+(IF(Cvalue>=0, IF(Pvalue>=0, ABS(Cvalue-Pvalue), Cvalue+ABS(Pvalue)), IF(Pvalue>=0, ABS(Cvalue)+Pvalue, ABS(Cvalue-Pvalue)))/(5+(65*Framp/100)))>100. This expression can be simplified to Pvalue+Factor 1/Ramp Factor 1>100. If the Pvalue plus Factor 1/Ramp Factor is greater than 100, then the Yaxis value is the Pvalue plus the step increment.

Factor 1 is (IF(Cvalue>=0, IF(Pvalue>=0, ABS(Cvalue-Pvalue), Cvalue+ABS(Pvalue)), IF(Pvalue>=0, ABS(Cvalue)+Pvalue, ABS(Cvalue-Pvalue))). Ramp Factor 1 is (5+(65*Framp/100)).

Factor 1 is based on an analysis of whether the Cvalue is greater than zero and, if so, an analysis of whether the Pvalue is greater than zero. If both these conditions are true, then Factor 1 is set to the absolute value of the difference of the Cvalue minus the Pvalue. If the Cvalue is greater than zero and the Pvalue is less than zero, than Factor 1 is set to the Cvalue plus the absolute value of the Pvalue.

If the Cvalue is less than zero, and the Pvalue is greater than zero, Factor 1 is set to the absolute value of the Cvalue plus the Pvalue. If the Cvalue is less than zero and the Pvalue is less than zero, Factor 1 is set to the absolute value of the Cvalue minus the Pvalue.

If the logic in step J19 evaluates to false or "No", the controller determines whether the Pvalue plus the step increment is greater than or equal to the Cvalue. If so, the adjusted Y coordinate is set to the Cvalue. If the Pvalue plus the step increment is less than the Cvalue the process continues to step J22.

In step J22, the controller analyzes the Cvalue and its relationship to the control range. The particular logic is (IF(Cvalue>=0, IF(Pvalue>=0, ABS(Cvalue-Pvalue), Cvalue+ABS(Pvalue)), IF(Pvalue>=0, ABS(Cvalue)+Pvalue, ABS(Cvalue-Pvalue)))/(5+(65*Ramp/100)))>=(200/(5+(65*Ramp/100)))/4*(0.75+(2.51−(2.51*Mdec/100))). This expression can be simplified to Factor 2/Scaling Factor 2>=Ramp Factor 2.

Factor 2 is (IF(Cvalue>=0, IF(Pvalue>=0, ABS(Cvalue-Pvalue), Cvalue+ABS(Pvalue)), IF(Pvalue>=0, ABS(Cvalue)+Pvalue, ABS(Cvalue-Pvalue))). Scaling Factor 2 is (5+(65*Ramp/100)).

Ramp Factor 2 is (200/(5+(65*Ramp/100)))/4*(0.75+(2.51-(2.51*Mdec/100))).

Factor 2 is based on an analysis of whether the Cvalue is greater than or equal to zero and, if so whether the Pvalue is greater than or equal to zero. If the Cvalue is greater than or equal to zero and the Pvalue is greater than or equal to zero, then Factor 2 is set to the absolute value of the Cvalue minus the Pvalue. If the Pvalue is less than zero, then Factor 2 is set to the Cvalue plus the absolute value of the Pvalue. If the Cvalue is less than zero and the Pvalue is greater than zero then Factor 2 is set to the absolute value of the Cvalue plus the Pvalue. If the Pvalue is less than zero, then Factor 2 is set to the absolute value of the Cvalue minus the Pvalue.

If Factor 2/Scaling Factor is greater than or equal to Ramp Factor 2 then the adjusted Y coordinate is set to the Pvalue plus the Ramp Factor 2 (step J22A). If Factor 2/Scaling Factor is less than Ramp Factor 2, then the process continues to step J22B.

In step J22B, the controller sets the adjusted Y coordinate to the Pvalue plus a certain factor, which for purposes of explanation is labeled or referred to as Factor 3. The particular logic is Pvalue+(IF(Cvalue>=0, IF(Pvalue>=0, ABS(Cvalue-Pvalue), Cvalue+ABS(Pvalue)), IF(Pvalue>=0, ABS(Cvalue)+Pvalue, ABS(Cvalue-Pvalue)))/(5+(65*Ramp/100))). This expression can be simplified to Pvalue+Factor 3. Factor 3 can be expressed as Factor 4/Scaling Factor 3.

Factor 4 is (IF(Cvalue>=0, IF(Pvalue>=0, ABS(Cvalue-Pvalue), Cvalue+ABS(Pvalue)), IF(Pvalue>=0, ABS(Cvalue)+Pvalue, ABS(Cvalue-Pvalue)))

Scaling Factor 3 is (5+(65*Ramp/100))).

Factor 4 is based on an analysis of whether the Cvalue is greater than or equal to zero and, if so whether the Pvalue is greater than or equal to zero. If the Cvalue is greater than or equal to zero and the Pvalue is greater than or equal to zero, then Factor 4 is set to the absolute value of the Cvalue minus the Pvalue. If the Pvalue is less than zero, then Factor 4 is set to the Cvalue plus the absolute value of the Pvalue. If the Cvalue is less than zero and the Pvalue is greater than zero then Factor 4 is set to the absolute value of the Cvalue plus the Pvalue. If the Pvalue is less than zero, then Factor 4 is set to the absolute value of the Cvalue minus the Pvalue.

Steps J26 through J30 are a corollary to Steps J18 through J22 and cover the case in which Cvalue is less than Pvalue. Since the corollary would be readily understood by those of ordinary skill in the art, it is not explained further herein.

Although the examples described above feature a skid steer vehicle, the methods described can be implemented in other types of vehicles including, for example, a front-end loader, a bulldozer, or a forklift. Furthermore, although the examples refer to a joystick-type controller, other input devices that provide inputs similar to an X and Y coordinate combination might be used to control the operation of the vehicle in other embodiments.

Thus, the invention provides, among other things, a system for controlling the operation of a vehicle based on an input from a joystick-type control. Various features and advantages of the invention are set forth in the following claims.

What is claimed is:

1. A system for controlling wheel or track motors of a vehicle based on information from a joystick-type control, the system comprising:
   a joystick control configured to generate signals indicative of an X coordinate and a Y coordinate based on a current position of the joystick control; and
   a vehicle controller communicatively coupled to the joystick control and configured to
      receive the X and Y coordinates from the joystick control,
      determine a control value for each of four vehicle control quadrants, the four vehicle control quadrants including a right-reverse quadrant, a right-forward quadrant, a left-reverse quadrant, and a left-forward control quadrant, the control value being indicative of the current position of the joystick control relative to each control quadrant, wherein the control value is determined based on comparisons of the X coordinate to zero, the Y coordinate to zero, and an absolute value of the X coordinate to an absolute value of the Y coordinate, determine an adjusted X and Y coordinate combination for at least one control quadrant based on the control value determined for the respective control quadrant and a previous control value calculated for that control quadrant, the previous control value being indicative of a previous position of the joystick control relative to each control quadrant, and control movement of the vehicle based on the adjusted X and Y coordinate combination for the at least one control quadrant.

2. The system as claimed in claim 1, further comprising a travel pump, and wherein the vehicle controller is further configured to determine an adjusted X and Y coordinate combination for each control quadrant, generate a signal based on the adjusted X and Y coordinate combination for each control quadrant, and transmit the signal based on the adjusted X and Y coordinate combination for the each control quadrant to the travel pump.

3. The system as claimed in claim 2, further comprising:

a right-side motor connected to the travel pump; and a left side motor connected to the travel pump.

4. The system as claimed in claim 1, wherein each of the adjusted X and Y coordinate are determined based on a plurality of adjustable, vehicle-specific control constants.

5. The system as claimed in claim 4, wherein the plurality of adjustable, vehicle-specific control constants include reverse ramp, forward ramp, maximum deceleration rate forward, and maximum deceleration rate reverse.

6. The system as claimed in claim 1, wherein the vehicle controller is further configured to determine a second control value and a second previous control value for each of the four vehicle control quadrants, wherein the second control value is indicative of a second position of the joystick control relative to each of the four vehicle control quadrants, and wherein the second position of the joystick control is different than the current position of the joystick control.

7. The system as claimed in claim 6, wherein the control value determined for each of the four vehicle control quadrants and indicative of the current position of the joystick control is used as the second previous control value determined for each of the four vehicle control quadrants and is indicative of a second previous position of the joystick control that is different than the previous position of the joystick control.

8. A method of controlling wheel or track motors of a vehicle based on information from a joystick-type control, the method comprising:

receiving, by a vehicle controller communicatively coupled to a joystick control, an X coordinate and a Y coordinate from the joystick control, the X and Y coordinates being indicative of a current position of the joystick control;

determining, via the vehicle controller, a vehicle control quadrant to which the X and Y coordinates are correlated, the vehicle control quadrant selected from a group of four vehicle control quadrants including a right-reverse quadrant, a right-forward quadrant, a left-reverse quadrant, and a left-forward control quadrant;

determining a control value for the vehicle control quadrant that has been determined, the control value being indicative of the current position of the joystick control relative to the vehicle control quadrant that has been determined, wherein the control value is determined based on comparisons of the X coordinate to zero, the Y coordinate to zero, and an absolute value of the X coordinate to an absolute value of the Y coordinate;

determining an adjusted X and Y coordinate combination for the vehicle control quadrant that has been determined based on the control value and a previous control value calculated for that control quadrant, the previous control value being indicative of a previous position of the joystick control relative to that quadrant; and controlling movement of the vehicle based on the adjusted X and Y coordinate combination.

9. The method as claimed in claim 8, further comprising:

determining the control value and the adjusted X and Y coordinate combination for each control quadrant based on the X and Y coordinate combination received from the joystick control;

generating a signal based on the on the adjusted X and Y coordinate combination for each control quadrant; and transmitting the signal based on the adjusted X and Y coordinate combinations for the each control quadrant to a travel pump.

10. The method as claimed in claim 8, wherein each of the adjusted X and Y coordinate are determined based on a plurality of adjustable, vehicle-specific control constants.

11. The method as claimed in claim 10, wherein the plurality of adjustable, vehicle-specific control constants include reverse ramp, forward ramp, maximum deceleration rate forward, and maximum deceleration rate reverse.

12. The method as claimed in claim 8, further comprising determining a second control value and a second previous control value for the vehicle control quadrant that has been determined, wherein the second control value is indicative of a second position of the joystick control relative to the vehicle control quadrant that has been determined, and wherein the second position of the joystick control is different than the current position of the joystick control.

13. The method as claimed in claim 12, wherein the control value determined for the vehicle control quadrant that has been determined and indicative of the current position of the joystick control is used as the second previous control value determined for the vehicle control quadrant that has been determined and is indicative of a second previous position of the joystick control that is different than the previous position of the joystick control.

14. The system as claimed in claim 1, wherein the vehicle controller is configured to determine an adjusted X and Y coordinate combination for the at least one control quadrant by determining an adjusted X coordinate based on a difference between the control value and the previous control value for the at least one control quadrant such that the adjusted X coordinate gradually increases over time from an X coordinate used to control movement of the vehicle to the X coordinate received from the joystick control.

15. The system as claimed in claim 14, wherein the vehicle controller is configured to determine an adjusted X and Y coordinate combination for the at least one control quadrant by determining an adjusted Y coordinate based on the difference between the control value and the previous control value for the at least one control quadrant such that the adjusted Y coordinate gradually increases over time from a Y coordinate used to control movement of the vehicle to the Y coordinate received from the joystick control.

16. The system as claimed in claim 1, wherein the control value for the left-forward control quadrant is set to at least one of:
- the absolute value of the Y coordinate,
- the absolute value of the X coordinate,
- a difference between the absolute value of the Y coordinate and the absolute value of the X coordinate, or
- a difference between the absolute value of the X coordinate and the absolute value of the Y coordinate.

17. The method as claimed in claim 8, wherein the control value for the left-forward control quadrant is set to at least one of:
- the absolute value of the Y coordinate,
- the absolute value of the X coordinate,
- a difference between the absolute value of the Y coordinate and the absolute value of the X coordinate, or
- a difference between the absolute value of the X coordinate and the absolute value of the Y coordinate.

* * * * *